March 7, 1950 — L. S. HAMER — 2,499,382
FLOW CONTROLLING DEVICE
Filed April 23, 1946 — 2 Sheets-Sheet 2
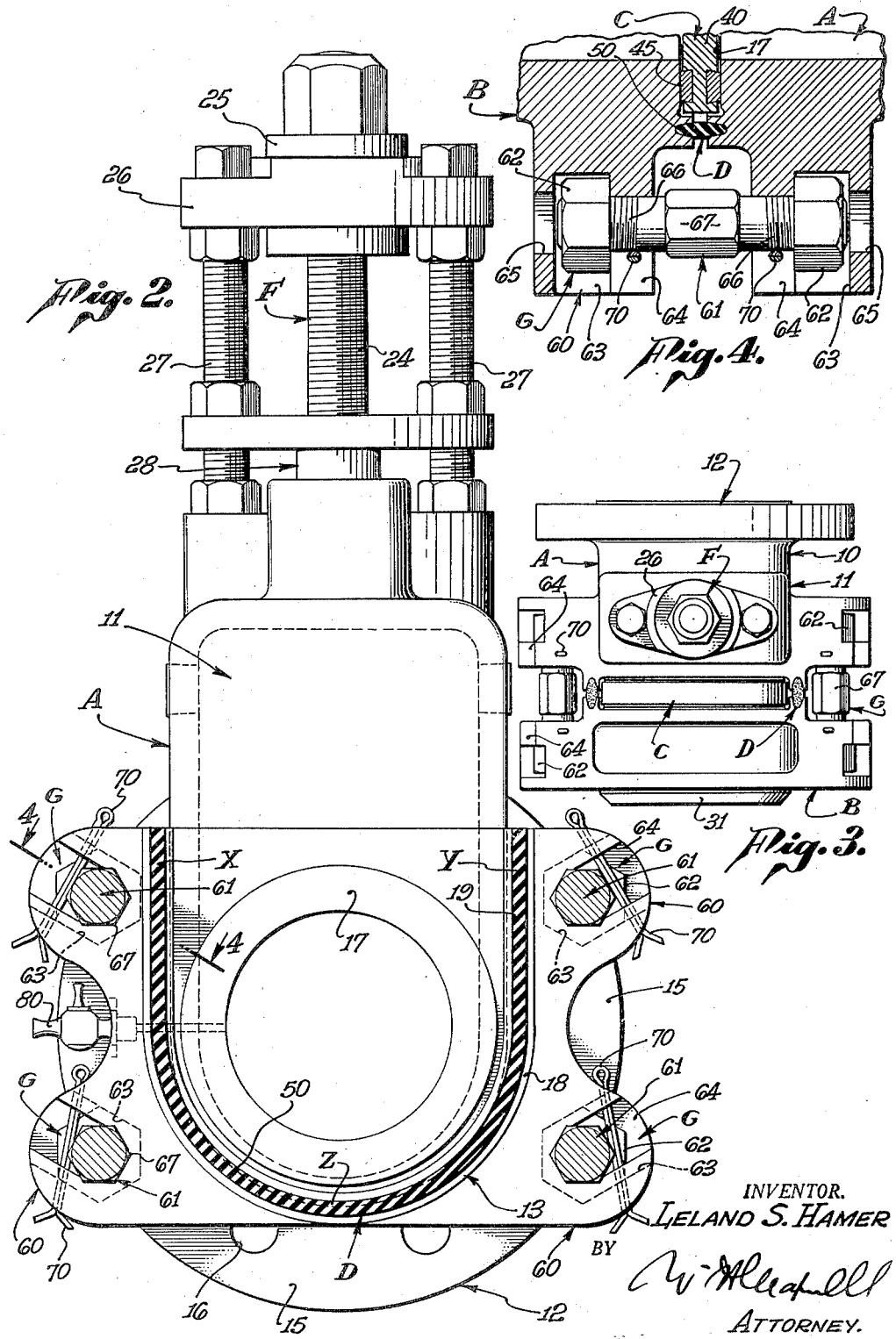
INVENTOR.
LELAND S. HAMER
ATTORNEY.

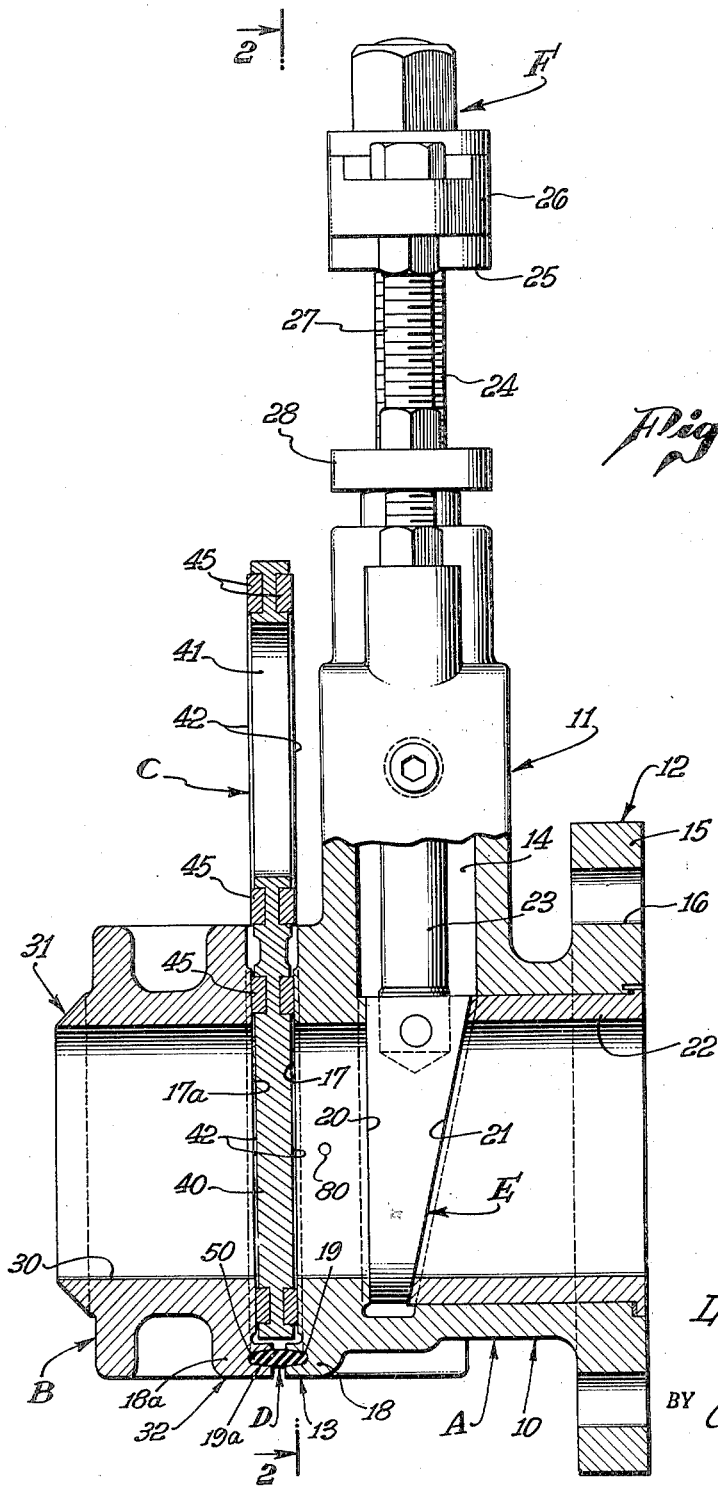

Patented Mar. 7, 1950

2,499,382

UNITED STATES PATENT OFFICE 2,499,382

FLOW CONTROLLING DEVICE

Leland S. Hamer, Long Beach, Calif., assignor of one-fourth to Paul A. Dewhirst, Los Angeles, Calif.

Application April 23, 1946, Serial No. 664,348

12 Claims. (Cl. 277—67)

This invention has to do with a flow controlling device and it relates more specifically to a device suitable for use in pipe lines or the like. It is a general object of the invention to provide a compact, simplified and practical unit or structure that is easily operated and which combines a flow controlling gate and a line blinding plate.

There are numerous situations, for instance in and around refineries, on ships, etc. where fluid conduits or pipe lines are controlled by gate valves and where it becomes necessary to supplement the gate valves by means of line blinds. Ordinarily such situations require two distinct fittings, a gate valve and a line blind, and the installation and operation of such fittings becomes expensive and many times not altogether practical.

It is a general object of my present invention to provide a device combining in a single compact simple unit a flow controlling gate and a line blind. A feature of the construction that I have provided is the fact that it is compact in an axial or longitudinal direction and is also short or compact vertically, making it suitable for installation in limited spaces where ordinarily it is impractical or difficult to install two distinct fittings.

Another general object of my present invention is to provide a simplified practical and improved operating means for actuating the sections of a fitting of the character referred to. By my invention I provide a differential thread actuating means which is very simple, inexpensive of manufacture, conveniently located and easy to operate.

The various objects and features of my invention will be fully understood from the following detailed description of a typical preferred form and application of the invention, throughout which description reference is made to the accompanying drawings, in which:

Fig. 1 is a vertical detailed sectional view of the structure provided by my invention taken longitudinally of the structure and showing the general arrangement and relationship of parts. Fig. 2 is a transverse sectional view taken substantially as indicated by line 2—2 of Fig. 1. Fig. 3 is a reduced plan view of the structure, and Fig. 4 is an enlarged detailed sectional view taken substantially as indicated by line 4—4 on Fig. 2.

The device of the present invention involves, generally, a body formed of two sections, a main section A and an end section B, a flow controlling plate C adapted to be inserted between the sections, sealing means D acting between the sections A and B independently of the plate, a flow control gate E operable in the main section of the body, operating means F for the gate, and means G connecting the sections of the body so that they can be readily operated relative to each other as will be hereinafter described.

The body of the structure is preferably formed of two units which may, in practice, be cast or otherwise suitably formed. The main unit or main section A of the body carries the gate E and its operating means F and includes, generally, a central tubular portion 10, a lateral extension 11 joined to the portion 10, connecting means 12 at the outer end of the portion 10, and a plate carrier 13 at the inner end of the section 10.

The central portion 10 of the body section A is a tubular part for passing fluid through the structure and the extension 11 is preferably formed integral with the portion 10 to extend laterally therefrom. The extension 11 has or forms a chamber 14 which intersects the opening that extends through the portion 10. The chamber 14 accommodates or receives the gate E when the gate is open or withdrawn from a position where it is in the central portion 10.

The connecting means provided at the outer end of the body section A may be of any suitable character and will, in practice, vary with the situation where the device is to be used. For purpose of example I have shown the connecting means in the form of a flange 15 on the end of the tubular section 10 and the flange 15 is provided with suitable bolt holes 16.

The plate carrier 13 at the inner end of the tubular part 10 is an annular part or extension of the center portion 10 provided with a face 17 to receive the plate C and formed to suitably cooperate with the means D. In the particular case illustrated the part 13 has an axially projecting flange portion 18 that extends somewhat beyond the plate 17 and which is formed with a tapered or wedge shaped channel 19 to receive the means D as will be hereinafter described.

The gate E which operates in or through the chamber 14 between a position where it extends across and closes the central tubular portion 10 of body section A and a position where it is withdrawn into the extension 11 may be any suitable form or type of gate. In the case illustrated I have shown a tapered gate and I have shown the body section A formed with one fixed or permanent seat 20 to receive one side of the gate and with a renewable or removable seat 21 to receive the other side of the gate. The seat 21 is on a sleeve or insert 22 inserted into the body section A from its outer end.

The means F provided for operating the gate E may be any suitable gate operating means. In the case illustrated the means F includes, primarily, a stem having a lower portion 23 connected to the gate E and a threaded upper portion 24 which operates through a suitable nut 25. The nut 25 is supported in a bracket 26 mounted above the extension 11 on posts 27. Suitable packing means 28 is provided around the stem where it enters the extension 11.

The end section B of the body cooperates with the main section in carrying the plate C and the means D. The section B is preferably a tubular part having a central axial opening 30 which forms a continuation of the flow carrying passage formed by the section A. The section B has connecting means 31 at its outer end and has a plate carrier 32 at its inner end. The connecting means 31 as shown in the drawings is preferably formed by suitably dressing or shaping the end of the section B so that the section can be readily welded to the end of a pipe or the like. It is to be understood that the connecting means 31 may correspond to that provided on section A, in which case it will be a flange or, if circumstances require, the means 12 on section A may be the same as that shown in the drawings on section B.

The plate carrier 32 of section B of the body is an annular part or continuation of the body section B provided with a flat face 17ª to oppose the face 17 and having a projecting flange 18ª with a groove or channel 19ª corresponding to and opposing the parts 18 and 19 of the body section A.

The plate C provided to act between the sections A and B may be a suitable flow controlling plate such as a line blinding plate or an orifice plate, as circumstances require. In Fig. 1 of the drawings I have shown a plate in place between the sections A and B with a solid or imperforate end 40 closing off the passage between the sections A and B and with the perforate end portion 41 of the plate out of use. It will be obvious how the plate can be reversed end for end when it is desired to establish flow through the structure. In the drawings I have shown the plate with flat side faces 42 having suitable sealing means 45 to fit and seal against the faces 17 and 17ª. It is to be understood that, in practice, I may provide sealing means either in or at the faces 17 and 17ª or on one or both sides of the plate C to facilitate the establishment and maintenance of a tight sealed connection between the body sections and the plate.

The means D acts between the sections A and B to prevent leakage of fluid from the structure as the plate is being manipulated, assuming that the line in which the fitting or device is connected is not under head. If the line in which the fitting is connected is under a head the pressure can be relieved at the down stream side of the gate by opening a pet cock 80 to relieve the pressure before operating the means G to remove the blind. The means D preferably includes a simple U-shaped sealing member such as a strip of suitable conformable material, say for instance a rubber-like composition. As will be observed from Fig. 2 of the drawings, the channels or grooves 19 and 19ª are not annular or do not extend completely around the face, but rather they are U-shaped and have vertical side portions X and Y joined by a curved bottom portion Z. The sealing member 50 of means D is shaped the same as the grooves 19 and 19ª and corresponds in length with the grooves so that when it is in place between the sections A and B, as shown throughout the drawings, an upwardly opening pocket is established between the body sections into which the plate C is lowered in order to be inserted between the body sections.

The means G connecting the body sections preferably involves, generally, two or more pairs of lugs 60 at each side of the device, nuts 62 carried by the lugs, and a tie member 61 joining the two lugs of each pair.

By confining the lugs to the sides of the structure, as shown in Fig. 2 of the drawings, there are no parts projecting downward from the body sections A and B in a manner to require substantial clearance below the device and the tie members 61 are all readily accessible from the sides of the device making is unnecessary to reach under the structure in order to operate any of the parts.

Each pair of lugs 60 includes two lugs on the sections A and B located to be opposite each other or to be opposed and it is preferred that the lugs be integrally formed with the body sections A and B as shown throughout the drawings. Each lug 60 is characterized by a nut socket 63 that extends downwardly and inwardly into it from its outer or projecting end portion, by a notch 64 in the inner side portion of the lug parallel with and communicating with the socket 63, and by an opening 65 in the outer side portion of the lug communicating with the socket 63.

The nuts 62 may be simple or common hexagonal nuts which slidably fit into the sockets 63 to be in substantial alignment with openings 65 when at the inner ends of the sockets. The flat sides of the nuts engage walls of the sockets so that the nuts are held against rotation.

The tie member 61 is a simple elongate rod or bar with threaded end portions 66 engaged in the nuts 62. It is to be observed that my construction and arrangement is such as to provide a substantial space between the two lugs 60 of each pair and that the tie member 61 has an enlargement or tool engaging part 67 intermediate its ends and occurring in the space between the lugs where it can be conveniently engaged and operated. In the particular case illustrated the tool receiving part 67 is polygonal in cross sectional configuration, making it such as to conveniently receive a wrench. It is to be understood, however, that it can be recessed in any manner to receive any kind of an operating tool or device.

In accordance with my invention I provide differential threads at the two ends of the member 61, that is, I make the threads at the two ends of the member 61 somewhat different so that when the member 61 is rotated a differential action is obtained, causing movement of the sections A and B either together or apart, depending upon the direction in which the member 61 is rotated. In the particular case illustrated I show lefthand threads at one end of the tie member and righthand threads at the other end, in which case the body sections A and B will be moved a substantial amount for a given amount of rotation of the member 61. If high leverage is desired the threads at the two ends of the member 61 may be pitched in the same direction but may be made of slightly different pitch, in which case a differential action will be received and I will obtain a very slight amount of movement between the sections A and B for the same or given amount of movement of the member 61.

By pitching the sockets 63 so that they extend downwardly and inwardly in the lugs the nuts can be easily dropped into place and will normally remain in position. However, I may, if desired, provide means to retain the assembly of the nuts and tie member in place. In the drawings I have shown retainer keys 70 arranged across the notches 64 to hold the tie member 61 against displacement from the notches. It is to be observed from Fig. 4 of the drawings how the tie member extends through the notches and then into the nuts located in the socket 63 and how the openings 65 provide clearance so that the ends of the tie member may project beyond the nuts.

In employing the structure that I have provided it may be connected in a pipe line or the like in any suitable manner as by connecting means such as I have described above. During the normal use of the device if the device is to be open the gate is moved up into the extension 11 of the body section A and the plate C is arranged so that the perforate portion 41 is in position between the sections A and B. With the plate in the desired position the connecting means G are operated to tightly clamp the plate between the body sections A and B to prevent leakage. In removing the gate E from the valve the flange 12 is disconnected from the pipe line and the sleeve 22 is removed, the relationship of parts being such as to allow for removal of the gate E through the flow carrying passage of the section A. If it is desired to remove the gate E from the body section A for the purpose of replacement or repair either of the gate or of the sealing parts that cooperate therewith, or for any other reason, the plate C may be maintained in position as shown in Fig. 1 of the drawings holding the line closed. Likewise, if the gate is operated to close off flow and it is desired to make the closure absolutely secure or safe, then the imperforate end of the plate can be arranged between the body sections, as shown in Fig. 1.

Having described only a typical preferred form and application of the invention, I do not wish to be limited or restricted to the specific details herein set forth, but wish to reserve to myself any variations or modifications that may appear to those skilled in the art and fall within the scope of the following claims.

Having described my invention, I claim:

1. A pipe line insert including a body with opposite vertical sides and having two aligned tubular flow carrying sections with connecting means at their outer ends, one section being a gate section the other an end section, a gate carried by the gate section operable to control flow therethrough, a blinding plate between the body sections and engaged thereby, and screw fasteners connecting the body sections together and operable to move the sections relative to each other into clamping engagement with the plate and confined to the said sides of the body sections.

2. A pipe line insert including a body with opposite vertical sides and having two aligned tubular flow carrying sections with connecting means at their outer ends, one section being a gate section the other an end section, a gate carried by the gate section operable to control flow therethrough, a blinding plate between the body sections and engaged thereby, and clamp means confined to the said sides of the body sections and connecting the body sections together and operable to move the sections relative to each other into clamping engagement with the plate and including two vertically spaced pairs of lugs at each side of the body and a tie member carried by each pair of lugs, each pair of lugs including a lug on the gate section and a lug on the end section.

3. A pipe line insert including a body with opposite vertical sides and having two aligned tubular flow carrying sections with connecting means at their outer ends, one section being an end section and the other being a gate section having a tubular center portion in line with the end section and having a lateral extension forming a chamber intersecting the opening through the center portion, a gate operable in said chamber into and out of position to close off flow through the center portion, a blinding plate between the body sections and engaged thereby, and clamp means confined to the said sides of the body sections and connecting the body sections together and operable to move the sections relative to each other into clamping engagement with the plate, the clamp means including two pairs of lugs at each of said sides of the body and a tie member carried by each pair of lugs.

4. A pipe line insert including a body having two aligned tubular flow carrying sections with connecting means at their outer ends, one section being an uninterrupted tubular end section and the other being a gate section having a tubular center portion in line with the end section and having a lateral extension forming a chamber intersecting the opening through the center portion, a gate operable in said chamber into and out of position to close off flow through the center section, a blinding plate between the body sections and engaged thereby, yielding sealing means between the body sections, and means connecting the body sections together and operable to clamp them to the plate.

5. A pipe line insert including a body having two aligned tubular flow carrying sections with connecting means at their outer ends, one section being a gate section the other an uninterrupted tubular end section, a gate confined in the gate section operable to control flow therethrough, a blinding plate between and engaged by the body sections, and differential screw means connecting the body sections together and operable to move the sections relative to each other into clamping engagement with the plate.

6. A pipe line insert including a body with opposite vertical sides and having two relatively movable aligned tubular flow carrying sections having connecting means at their outer ends, one section being a gate section the other an uninterrupted tubular end section, a gate carried by the gate section operable to control flow therethrough, a blinding plate between the body sections, and differential screw means connecting the body sections together and operable to move the sections relative to each other into clamping engagement with the plate, the said means being confined to the said sides of the body.

7. A pipe line insert including a body having two relatively movable aligned tubular flow carrying sections with connecting means at their outer ends, one section being a main section the other an end section, a gate carried by the main section operable to control flow therethrough, a blinding plate between the body sections, and clamp means connecting the body sections together and operable to move the sections relative to each other into clamping engagement with the plate, including opposed lugs on the body sections, each lug having a socket therein, nuts carried in the sockets and tie members extending between the lugs and having threaded end portions engaged in the nuts, the threads on the said end portions being differently pitched.

8. A pipe line insert including a body with opposite vertical sides and having two relatively movable aligned tubular flow carrying sections with connecting means at their outer ends, one section being a gate section the other an uninterrupted tubular end section, a gate carried by the gate section operable to control flow therethrough, a blinding plate between the body sections, and clamp means connecting the body sections together and operable to move the sections relative to each other into clamping engagement with the plate, including opposed lugs on the body sections, each lug having a socket extending downwardly and inwardly into it, nuts carried in the sockets and tie members extending between the lugs and threaded in the nuts.

9. A pipe line insert including a body having two relatively movable aligned tubular flow carrying sections with connecting means at their outer ends, one section being a main section the other an end section, a gate carried by the main section operable to control flow therethrough, a blinding plate between the body sections, yielding sealing means between the body sections, and clamp means connecting the body sections together and operable to move the sections relative to each other into clamping engagement with the plate and including two pairs of lugs at each side of the body and a tie member carried by each pair of lugs and having a tool receiving part between the lugs.

10. A pipe line insert including a body having two relatively movable aligned tubular flow carrying sections with connecting means at their outer ends, one section being a gate section the other an uninterrupted tubular end section, a gate carried by the gate section operable to control flow therethrough, a blinding plate between the body sections and engaged thereby, and clamp means confined to the sides of the body connecting the body sections together and operable to move the sections relative to each other into clamping engagement with the plate and including two pairs of lugs at each side of the body and a tie member carried by each pair of lugs and having a polygonal part between the lugs to receive a tool.

11. A pipe line insert including a body with opposite vertical sides and having two relatively movable flow carrying sections with connecting means at their outer ends, one section being a gate section with a lateral chamber the other an uninterrupted tubular end section, a gate carried by the gate section operable to control flow therethrough and retractible into the chamber, a blinding plate between the body sections, yielding sealing means between the body sections, and clamp means confined to the said sides of the body connecting the body sections together and operable to move the sections relative to each other into clamping engagement with the plate, including opposed lugs on the body sections, each lug having a socket therein, nuts carried in the sockets and tie members extending between the lugs and threaded in the nuts, the tie members having a tool receiving part between the lugs.

12. A pipe line insert including a body having two aligned tubular flow carrying sections with connecting means at their outer ends, one body section being a gate section the other an uninterrupted tubular end section, a gate confined in the gate section operable to control flow therethrough, a reversible blinding plate between the body sections and projecting laterally therefrom, and differential screw means connecting the body sections together and operable to move the sections relative to each other into clamping engagement with the plate.

LELAND S. HAMER.

REFERENCES CITED

The following references are of record in the file of this patent:

UNITED STATES PATENTS

| Number | Name | Date |
|---|---|---|
| 485,409 | Hayden | Nov. 1, 1892 |
| 786,393 | McArthur | Aug. 23, 1904 |
| 1,226,380 | Riley | May 15, 1917 |
| 1,613,138 | Seymour | Jan. 4, 1927 |
| 1,842,056 | Westling | Jan. 19, 1932 |
| 1,981,825 | Miller | Nov. 20, 1934 |
| 2,042,067 | Leach | May 26, 1936 |
| 2,151,596 | Halle | Mar. 21, 1939 |
| 2,203,989 | Hamer | June 11, 1940 |
| 2,339,970 | Young | Jan. 25, 1944 |